United States Patent
Haga et al.

(10) Patent No.: US 12,330,946 B2
(45) Date of Patent: Jun. 17, 2025

(54) CARBON MATERIAL FOR NEGATIVE ELECTRODE OF LITHIUM ION SECONDARY BATTERY AND METHOD OF PRODUCING THE SAME, AND NEGATIVE ELECTRODE AND LITHIUM ION SECONDARY BATTERY USING THE CARBON MATERIAL

(71) Applicant: JFE CHEMICAL CORPORATION, Tokyo (JP)

(72) Inventors: Ryuta Haga, Tokyo (JP); Tetsuo Shiode, Tokyo (JP)

(73) Assignee: JFE CHEMICAL CORPORATION, Tokyo (JP)

( * ) Notice: Subject to any disclaimer, the term of this patent is extended or adjusted under 35 U.S.C. 154(b) by 1060 days.

(21) Appl. No.: 17/296,488

(22) PCT Filed: Dec. 1, 2020

(86) PCT No.: PCT/JP2020/044614
§ 371 (c)(1),
(2) Date: May 24, 2021

(87) PCT Pub. No.: WO2021/166359
PCT Pub. Date: Aug. 26, 2021

(65) Prior Publication Data
US 2022/0127146 A1    Apr. 28, 2022

(30) Foreign Application Priority Data

Feb. 19, 2020  (JP) ................................ 2020-026174

(51) Int. Cl.
*C01B 32/205* (2017.01)
*C01B 32/05* (2017.01)
(Continued)

(52) U.S. Cl.
CPC ............ *C01B 32/205* (2017.08); *C01B 32/05* (2017.08); *C01B 32/20* (2017.08); *H01M 4/043* (2013.01);
(Continued)

(58) Field of Classification Search
CPC .. C01B 32/205; C01B 32/21; H01M 10/0525; H01M 2004/027; H01M 4/0471;
(Continued)

(56) References Cited

U.S. PATENT DOCUMENTS 6,632,569 B1   10/2003  Kameda
2004/0151837 A1*  8/2004  Morita .................... C01B 32/05
427/372.2
(Continued)

FOREIGN PATENT DOCUMENTS

CN       1261729 A     8/2000
CN     101939865 A     1/2011
(Continued)

OTHER PUBLICATIONS

WO2016136803 English translation. Koseki et al. Wipo. Sep. 1, 2016. (Year: 2016).*
(Continued)

*Primary Examiner* — Christopher P Domone
(74) *Attorney, Agent, or Firm* — NIXON & VANDERHYE

(57) ABSTRACT

Provided is a carbon material for a negative electrode of a lithium ion secondary battery, which has a small particle diameter, high initial charge-discharge efficiency, and a high 2 C discharge rate, and achieves both input-output characteristics and durability. Disclosed is a carbon material for a negative electrode of a lithium ion secondary battery, in which a 50% by volume particle diameter in a cumulative frequency distribution is 1.0 μm or more and less than 5.0

(Continued)

μm, a specific surface area by a BET method is 6.5 m²/g or less, a tap density ($D_{TAP}$) is 0.70 g/cm³ or more, and a Raman R value obtained by Raman spectroscopy is more than 0.100 and less than 0.300, and the carbon material has a carbonaceous film on a surface of graphitized material particles of a mesophase microbead.

14 Claims, 1 Drawing Sheet

(51) Int. Cl.
| | |
|---|---|
| C01B 32/20 | (2017.01) |
| H01M 4/04 | (2006.01) |
| H01M 4/1391 | (2010.01) |
| H01M 4/36 | (2006.01) |
| H01M 4/587 | (2010.01) |
| H01M 4/62 | (2006.01) |
| H01M 10/0525 | (2010.01) |
| H01M 4/02 | (2006.01) |

(52) U.S. Cl.
CPC ....... H01M 4/0471 (2013.01); H01M 4/1391 (2013.01); H01M 4/366 (2013.01); H01M 4/587 (2013.01); H01M 4/628 (2013.01); H01M 10/0525 (2013.01); *C01P 2004/61* (2013.01); *C01P 2004/80* (2013.01); *C01P 2006/11* (2013.01); *C01P 2006/12* (2013.01); *H01M 2004/021* (2013.01)

(58) Field of Classification Search
CPC .... H01M 4/1393; H01M 4/366; H01M 4/587; H01M 4/625; H01M 4/133; H01M 4/583; H01M 2004/021; Y02E 60/10
See application file for complete search history.

(56) References Cited

U.S. PATENT DOCUMENTS

| | | | |
|---|---|---|---|
| 2009/0191462 A1 | 7/2009 | Matsui et al. | |
| 2011/0059371 A1* | 3/2011 | Kamada | H01M 4/587 429/207 |
| 2012/0052393 A1 | 3/2012 | Kameda | |

FOREIGN PATENT DOCUMENTS

| | | | | |
|---|---|---|---|---|
| CN | 102362381 A | * | 2/2012 | ........... C01B 31/04 |
| EP | 0 549 802 A1 | | 7/1993 | |
| JP | 5-290833 | | 11/1993 | |
| JP | 8-31420 | | 2/1996 | |
| JP | 11-199211 | | 7/1999 | |
| JP | 2000-138061 | | 5/2000 | |
| JP | 2001-107057 | | 4/2001 | |
| JP | 2007-31233 | | 2/2007 | |
| JP | 2007-42611 | | 2/2007 | |
| JP | 2009-187939 | | 8/2009 | |
| JP | 2009-211818 | | 9/2009 | |
| JP | 2011-119139 | | 6/2011 | |
| JP | 2014-67642 | | 4/2014 | |
| JP | 5742153 | | 7/2015 | |
| KR | 10-2000-0035742 A | | 6/2000 | |
| KR | 10-2019-0077446 | | 7/2019 | |
| KR | 10-2019-0141172 | | 12/2019 | |
| TW | 587350 B | | 5/2004 | |
| TW | I668901 B | | 8/2019 | |
| WO | 2016/136524 | | 9/2016 | |
| WO | WO-2018123967 A1 | * | 7/2018 | .......... H01M 10/052 |
| WO | 2018/207333 | | 11/2018 | |
| WO | 2018/207410 | | 11/2018 | |
| WO | 2018/207896 | | 11/2018 | |
| WO | 2019/151201 | | 8/2019 | |

OTHER PUBLICATIONS

CN104916841 English translation. Hattori et al. China. Sep. 16, 2015. (Year: 2015).*
Communication under Rule 71(3) EPC issued in European Patent Application No. 20 883 678.3 dated Apr. 6, 2023.
International Search Report and Written Opinion of the ISA for PCT/JP2020/044614 dated Feb. 2, 2021, 9 pages.
Office Action issued in European Patent Application No. 20 883 678.3 dated Dec. 22, 2022.
Office Action issued in Korean Patent Application No. 10-2021-7010304 dated May 18, 2021.
Office Action issued in Taiwanese Patent Application No. 109144379 dated May 24, 2021.
Extended European Search Report issued in European Patent Application No. 20883678.3 dated Dec. 8, 2021.
Office Action and Search Report, issued in Chinese Patent Application No. 202080005723.4 dated Jan. 20, 2024.

* cited by examiner

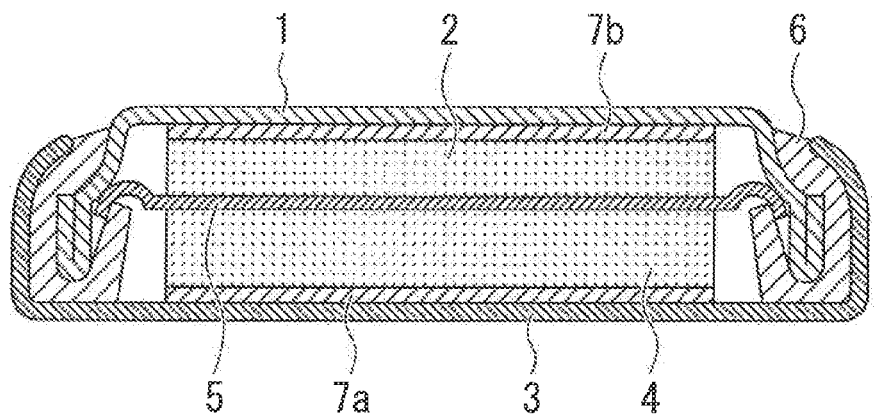

CARBON MATERIAL FOR NEGATIVE ELECTRODE OF LITHIUM ION SECONDARY BATTERY AND METHOD OF PRODUCING THE SAME, AND NEGATIVE ELECTRODE AND LITHIUM ION SECONDARY BATTERY USING THE CARBON MATERIAL

This application is the U.S. national phase of International Application No. PCT/JP2020/044614 filed Dec. 1, 2020 which designated the U.S. and claims priority to Japanese Patent Application No. 2020-026174 filed Feb. 19, 2020, the entire contents of each of which are hereby incorporated by reference.

BACKGROUND OF THE INVENTION

Field of the Invention

The present invention relates to a carbon material for a negative electrode of a lithium ion secondary battery and method of producing the same, and a negative electrode and a lithium ion secondary battery using the carbon material.

Background Art

Description of the Related Art

Recently, there has been growing international awareness of global environmental protection, and accordingly in the automotive industry, attention has focused on hybrid vehicles (HEVs and PHEVs) and electric vehicles (EVs) that can realize reductions in the usage of fossil fuels and $CO_2$ emissions. Research and development on lithium ion secondary batteries (LIB), which have a high energy density per unit volume and unit mass and are capable of being reduced in size, has been becoming more active in order to allow lithium ion secondary batteries to be used as a power supply (vehicle-mounted battery) for driving a hybrid vehicle or an electric vehicle. At present, a carbon material is commonly used as a material used for a negative electrode of a lithium ion secondary battery. In addition to the carbon material, lithium salts of metals such as Si, Sn, Ti, and V, lithium salts of oxides of these metals, a carbon-metal hybrid material, and the like that have high energy density are still being studied.

Among the carbon materials, graphite materials generally have a high capacity and therefore have been widely used for mobile electronic equipment and the like, and the graphite materials are mainly used as materials for negative electrodes of vehicle-mounted batteries. However, on the other hand, for hybrid vehicles, the graphite materials may be used in combination with non-graphitizable carbon materials or graphite materials that have high input-output characteristics and cycle durability.

As the graphite-based materials, natural graphite, artificial graphite particles obtained from a high-temperature fired coke and the like, graphitized materials such as pitch-based carbon fiber or mesophase carbon fiber, artificial graphite such as mesophase-based graphite particles obtained by heat-treating mesophase pitch using tar and pitch as raw materials, and the like are mainly used.

As the mesophase-based graphite particles, for example, Patent Literature 1 discloses graphite particles obtained by carbonizing carbonaceous mesophase particles produced when a heat-melting temperature of pitches is maintained at 350 to 500° C. and then graphitizing the carbonaceous mesophase particles at 2500 to 2900° C.

In addition, hybrid vehicles are required to have batteries that can be used in a wide variety of applications, such as idling stop system (ISS) and running with batteries, according to the vehicle type and the hybrid system of the vehicle, and a carbon material for a negative electrode in which input-output characteristics required for lithium ion batteries for hybrid vehicles and cycle durability are improved is required.

Although the mesophase-based graphite particles generally have excellent cycle durability, the input-output characteristics are insufficient as compared with natural graphite particles, so that there has been a problem that the mesophase-based graphite particles are difficult to apply to applications that require input-output characteristics. Thus, in order to improve the input-output characteristics, it is conceivable to reduce a particle diameter or increase the specific surface area of particles by a BET method. As a carbon material having small particles, for example, Patent Literature 2 discloses a method of producing a powdery/granular material in which a 50% by volume particle diameter $D_{50}$ is 1.8 μm to 15 μm in a cumulative frequency distribution.

Patent Literature 3 discloses a multilayer-structured carbon material in which a surface of graphite particles is coated with amorphous carbon and a technique in which by using a carbon material having an average particle diameter d50 of 1 μm to 18 μm and having a specific surface area measured using the BET method of 6.5 $m^2/g$ to 10 $m^2/g$, negative electrode resistance is reduced and storage characteristics are prevented from being deteriorated.

In addition, Patent Literature 4 describes a mesophase carbon microbead graphitized material in which a carbide of mesophase carbon microbeads is pulverized, then graphitized, and fired at 1300° C. for 3 hours and which has a carbonaceous film.

CITATION LIST

Patent Literature

Patent Literature 1: JP 5-290833 A
Patent Literature 2: JP 8-31420 A
Patent Literature 3: JP 5742153 B
Patent Literature 4: JP 2009-187939 A

SUMMARY OF THE INVENTION

However, as a result of examination by the present inventors, in the technique described in Patent Literature 2, there are problems that initial efficiency (means a ratio of an initial discharge capacity to an initial charge capacity in a charge-discharge test and is also referred to as initial charge-discharge efficiency) is low and the capacity as a battery is low. The technique described in Patent Literature 3 is an invention relating mainly to a carbon material having a multi-layer structure in which amorphous carbon is composited with spheroidized natural graphite particles that are small-particle diameter particles (there is no description of artificial graphite in Examples), the specific surface area by the BET method is as large as 6.5 $m^2/g$ or more, and the initial efficiency of the battery may deteriorate. In addition, Patent Literature 4 describes an example using the graphitized material of mesophase carbon microbeads; however, a 2C discharge rate (discharge characteristics) is not always sufficient, and it is disadvantageous when high input/output characteristics are required. In Patent Literature 4, it is presumed that this is because the firing has been performed at a relatively high temperature of 1300° C. for a short time of 3 hours.

The present invention has been made in view of the above-described background art, and an object of the invention is to provide a carbon material for a negative electrode of a lithium ion secondary battery, which uses mesophase-based graphite particles of artificial graphite as a raw material and has high initial efficiency and a high 2C discharge rate even if the particle diameter is reduced.

Solution to Problem

As a result of diligent studies to solve the above problems, the present inventors have found that carbonaceous particles mainly having mesophase microbeads as a raw material are pulverized and then graphitized, a surface of the graphitized carbonaceous particles is covered with an amorphous carbonaceous material and fired at low temperature for a long time, so that it is possible to obtain a carbon material for a negative electrode in which initial efficiency and a 2C discharge rate are improved and which has a low specific surface area. Thus, they arrived at the present invention.

That is, the present invention provides the following [1] to [10].

[1] A carbon material used for a negative electrode of a lithium ion secondary battery, which has a carbonaceous film on a surface of graphitized material particles of a mesophase microbead. In this carbon material for a negative electrode, a 50% by volume particle diameter ($D_{50}$) in a cumulative frequency distribution is 1.0 μm or more and less than 5.0 μm, a specific surface area ($S_{BET}$) by a BET method is 6.5 m²/g or less, a tap density ($D^{TAP}$) is 0.70 g/cm³ or more, and a Raman R value obtained by Raman spectroscopy is more than 0.100 and less than 0.300.

[2] The carbon material for a negative electrode in [1], in which a specific surface area ratio ($S_{BET}/S_{CALC}$) between the specific surface area ($S_{BET}$: m²/g) obtained by the BET method and the specific surface area ($S_{CALC}$: m²/g) calculated from the following equation (1) is 10.0 or less.

$$S_{CALC} = 6/(D_{50} \times \rho) \quad (1)$$

Here, $D_{50}$: 50% by volume particle diameter (μm) in the cumulative frequency distribution, ρ: true specific gravity (g/cm³).

[3] The carbon material for a negative electrode in [1] or [2], in which a value of an average interplanar spacing $d_{002}$ of (002) plane as lattice plane determined by an X-ray diffraction method is 0.3400 nm or less.

[4] A method of producing the carbon material for a negative electrode according to any one of [1] to [3], including a step of pulverizing a carbide of a mesophase microbead so that a 50% by volume particle diameter ($D_{50}$) in a cumulative frequency distribution of particles of the carbide is 1.0 μm or more and less than 5.0 μm (pulverizing treatment step), a step of graphitizing the particles of the carbide at 2600° C. to 3200° C. to form graphitized material particles (graphitization treatment step), a step of coating a surface of the graphitized material particles with a carbonaceous precursor in an amount of 0.5% by mass to 10.0% by mass (surface coating step), and a step of firing the graphitized material particles coated with the carbonaceous precursor at 900° C. to 1200° C. to form the carbonaceous precursor into a carbonaceous film (firing step).

[5] The method of producing a carbon material for a negative electrode in [4], in which the firing step is performed at 900° C. to 1200° C. for more than 3 hours.

[6] A negative electrode for a lithium ion secondary battery using the carbon material for a negative electrode according to any one of [1] to [3].

[7] A lithium ion secondary battery using the negative electrode for a lithium ion secondary battery according to [6] as an electrode.

Advantageous Effects of Invention

According to the present invention, it is possible to obtain a carbon material for a negative electrode of a lithium ion secondary battery in which initial efficiency and a 2C discharge rate are improved and which has a low specific surface area, a negative electrode, and a lithium ion secondary battery.

BRIEF DESCRIPTION OF THE SOLE DRAWING

The sole drawing is a cross-sectional view showing a coin-shaped secondary battery for evaluation.

DESCRIPTION OF THE PREFERRED EMBODIMENTS

Hereinafter, the present invention will be described in more detail.

[Carbon Material for Negative Electrode]

First, an embodiment of a carbon material for a negative electrode of the present invention will be described.

The carbon material for a negative electrode (hereinafter, also simply referred to as "carbon material") of the present invention is characterized in that a 50% by volume particle diameter ($D_{50}$) in a cumulative frequency distribution is 1.0 μm or more and less than 5.0 μm, a specific surface area ($S_{BET}$) by a BET method is 6.5 m²/g or less, a tap density ($D_T$) is 0.70 g/cm³ or more, and a raman R value obtained by Raman spectroscopy is more than 0.100 and less than 0.300.

[Average Particle Diameter]

The 50% by volume particle diameter ($D_{50}$) in the cumulative frequency distribution of the carbon material of the present invention is 1.0 μm or more and less than 5.0 μm. This is because if the 50% by volume particle diameter is less than 1.0 μm, reaction with an electrolytic solution becomes large, initial efficiency decreases, and if the 50% by volume particle diameter is 5.0 μm or more, a non-surface area becomes small, so that input-output characteristics deteriorate. The lower limit is more preferably 2.0 μm or more, further preferably 2.2 μm or more, and particularly preferably 3.0 μm or more. The upper limit is more preferably 4.5 μm or less, further preferably 4.0 μm or less, and particularly preferably 3.5 μm or less.

The 50% by volume particle diameter ($D_{50}$) in the cumulative frequency distribution can be obtained by a laser diffraction/scattering method, and is a particle diameter in which a cumulative total is 50% from the smallest particles on a volume basis. This particle diameter ($D_{50}$) is measured in accordance with JIS Z 8825: 2013, and by a laser diffraction type particle diameter distribution meter, the particle diameter ($D_{50}$) is measured using an aqueous solution prepared by adding 3% Triton X-100 as a surfactant to ion-exchanged water as a dispersion medium.

[Specific Surface Area by BET Method]

The specific surface area ($S_{BET}$) of the carbon material of the present invention, which is obtained by the BET method is preferably 6.5 m²/g or less because the reaction with the electrolytic solution that lowers the initial efficiency is suppressed. The specific surface area (SBET) is more preferably less than 6.5 m$^2$/g, further preferably less than 5.0 m$^2$/g, even more preferably 1.0 m$^2$/g to 4.5 m$^2$/g, and particularly preferably 1.1 m$^2$/g to 4.0 m$^2$/g. In the measurement of the specific surface area by the BET method, the specific surface area is obtained by a specific surface area measurement method of powders by adsorption of nitrogen gas based on JIS Z 8830: 2013.

[Tap Density]

The tap density ($D_{TAP}$) of the carbon material of the present invention is preferably 0.70 g/cm$^3$ or more because if the tap density is too small, it becomes difficult to increase a packing density at the time of forming the negative electrode. The tap density ($D_{TAP}$) is more preferably 0.70 g/cm$^3$ to 1.20 g/cm$^3$, further preferably 0.70 g/cm$^3$ to 1.15 g/cm$^3$, even more preferably 0.70 g/cm$^3$ to 1.10 g/cm$^3$, and particularly preferably 0.70 g/cm$^3$ or more and less than 0.85 g/cm$^3$. The tap density was measured with a tap stroke of 3 mm and a number of tacks of 300 times using a tap density measuring device (tapping device) based on JIS Z 2512: 2012.

[Graphite Particles]

Next, the carbon material of the present invention is graphitized material particles of mesophase microbeads, and has a carbonaceous film on the surface of the graphitized material particles. Graphitized mesophase microbeads are used because good cycle characteristics and rate characteristics are provided by stacking the mesophase microbeads randomly when the negative electrode is formed and the mesophase microbeads are not easily crushed during the production of the negative electrode.

The film formed on the surface of the graphitized material particles is a film of a carbonaceous fired body obtained by coating and firing a precursor material of amorphous carbon such as a coal-based pitch, as described in a method of producing a carbon material for a negative electrode, which will be described later. A carbon material for a negative electrode having excellent initial efficiency can be obtained by coating amorphous carbon.

[Specific Surface Area Ratio]

In the carbon material of the present invention, a specific surface area ratio ($S_{BET}/S_{CALC}$) between the specific surface area ($S_{BET}$: m$^2$/g) obtained by the BET method and the specific surface area ($S_{CALC}$: m$^2$/g) calculated from the following equation (1) is preferably 10.0 or less.

$$S_{CALC} = 6/(D_{50} \times \rho) \quad (1)$$

Here, $D_{50}$: 50% by volume particle diameter (μm) in the cumulative frequency distribution, ρ: true specific gravity (g/cm$^2$).

This equation (1) can be obtained as follows.

Assuming that the diameter of one particle is D (m), the specific surface area is S (m$^2$/g), and the weight is w (g), $$S = \{4 \times \pi \times (D/2)^2\}/w \quad (2)$$

The true specific gravity ρ (g/m$^3$) is $$\rho = w/\{4/3 \times \pi \times (D/2)^3\} \quad (3)$$

That is, $$w = \rho \times \{4/3 \times \pi \times (D/2)^3\} \quad (4)$$

Substituting this equation (4) into the equation (2), $$S = \{4 \times \pi \times (D/2)^2\}/\{\rho \times 4/3 \times \pi \times (D/2)^3\} \quad (5)$$

That is, S=6/(ρ×D) . . . (6), and the above equation (1) is obtained.

The specific surface area ratio ($S_{BET}/S_{CALC}$) means roughness (unevenness) of the particle surface, and is preferably 10.0 or less. This is because if the value is more than 10.0, the unevenness of the particle surface is too large, and reactivity with the electrolytic solution becomes too large. The ratio is more preferably 7.0 or less. The ratio is still more preferably 5.0 or less. The true specific gravity (ρ) was measured by using butanol as a standard substance and using a hydrometer (pycnometer) based on JIS Z 8807: 2012.

[Particle Characteristics by Raman Spectroscopy]

In the carbon material of the present invention, the raman R value obtained by the Raman spectroscopy is preferably more than 0.100 and less than 0.300.

The Raman spectroscopy is defined in JIS K 0137: 2010, and is a method of analyzing a molecular-level structure of a substance from a Raman spectrum obtained by dispersing Raman scattered light that occurs when the substance is irradiated with light. When a carbon material is subjected to Raman measurement, a G-band peak derived from a graphite structure is confirmed around 1580 cm$^{-1}$, and a D-band peak that appears when symmetry is disturbed due to introduction of defects is confirmed around 1360 cm$^{-1}$. A ratio ($I_D/I_G$) of a peak intensity ($I_G$) of the G band around 1580 cm-1 to a peak intensity ($I_D$) of the D band around 1360 cm-1 is referred to as the Raman R value. This Raman R value is inversely correlated with a crystallite size obtained by an X-ray diffraction method, when the Raman R value is small, crystallinity is high, and when the Raman R value is large, the crystallinity is low. The Raman R value of the carbon material of the present invention is preferably 0.125 to 0.250. The Raman R value is more preferably more than 0.140 and less than 0.200. The Raman R value is still more preferably 0.145 to 0.190. The Raman R value is most preferably 0.150 to 0.170.

[Particle Characteristics by X-Ray Diffraction Method]

In the carbon material of the present invention, in addition, a value of an average interplanar spacing $d_{002}$ of (002) plane as lattice plane determined by the X-ray diffraction method is preferably 0.3400 nm or less.

A method of measuring the lattice constant and crystallite size of the carbon material by the X-ray diffraction method is a diffraction method by the so-called Gakushin method established by the 117th Committee of the Japan Society for the Promotion of Science, and is also specified in JIS R 7651: 2007. Based on this measurement method, the $d_{002}$ value which is the average interplanar spacing of the (002) plane as the lattice plane is obtained. This $d_{002}$ value is one of indexes showing the crystallinity of the carbon material. When the $d_{002}$ value is large, the crystallinity is low, and when the $d_{002}$ value is small, the crystallinity is high. A graphite crystal has a hexagonal layered structure, and regular hexagonal network planes of carbon are stacked in parallel. By heat-treating a carbonized material, graphitization, that is, crystallization of the material proceeds. As graphitization proceeds, a crystal size (crystallite size) increases, and the average interplanar spacing ($d_{002}$ value) approaches 0.3354 nm (theoretical value) of an ideal graphite crystal. From the above, the $d_{002}$ value of the carbon material of the present invention is preferably 0.3400 nm or less. This is because the crystallinity becomes low when the $d_{002}$ value is more than 0.3400 nm. The $d_{002}$ value is more preferably 0.3370 nm or less. The $d_{002}$ value is further preferably 0.3362 nm or less.

[Method of Producing Carbon Material for Negative Electrode]

The method of producing the carbon material for a negative electrode according to the present invention includes a step of pulverizing a carbide of a mesophase microbead so that the 50% by volume particle diameter ($D_{50}$) in the cumulative frequency distribution of particles of the carbide is 1.0 μm or more and less than 5.0 μm (pulverizing treatment step), a step of graphitizing the particles of the carbide at 2600° C. to 3200° C. to form graphitized material particles (graphitization treatment step), a step of coating a surface of the graphitized material particles with a carbonaceous precursor in an amount of 0.5% by mass to 10.0% by mass (surface coating step), and a step of firing the graphitized material particles coated with the carbonaceous precursor at 900° C. to 1200° C. to form the carbonaceous precursor into a carbonaceous film (firing step).

[Pulverizing Treatment Step]

The mesophase microbeads are optical anisotropic microbeads having a particle diameter of several μm to several tens of μm generated in a pitch matrix when petroleum-based or coal-based pitches are heated at a temperature of about 350 to 450° C. The microbeads are extracted and separated from the pitch matrix using a solvent such as benzene, toluene, quinoline, tar medium oil, and tar heavy oil. The separated mesophase microbeads are fired at a temperature of 350° C. or higher, preferably 350 to 900° C. to obtain a carbide of the mesophase microbeads. The firing can be performed in an inert atmosphere using a rotary kiln or the like.

The carbide of the mesophase microbeads is pulverized so that the 50% by volume particle diameter ($D_{50}$) in the cumulative frequency distribution is 1.0 μm or more and less than 5.0 μm. By reducing the $D_{50}$ particle diameter, the input-output characteristics are improved. The reaction with the electrolytic solution becomes large, the initial efficiency decreases, and if the 50% by volume particle diameter is 5.0 μm or more, a non-surface area becomes small, so that input-output characteristics deteriorate. The 50% by volume particle diameter is more preferably 2.0 μm to 4.5 μm, further preferably 2.4 μm to 4.0 μm, and particularly preferably 3.0 μm to 3.5 μm.

The pulverizing method is not particularly limited, and the pulverization can be performed using a conventionally known general pulverizing machine. Examples of pulverizing machines include a rotary ball mill, a single track jet mill (manufactured by Seishin Enterprise Co., Ltd.), a counter jet mill (manufactured by Hosokawa Micron Corporation), a current jet (manufactured by Nisshin Engineering Inc.), and a high-speed swing hammer type pulverizing machine (manufactured by Dulton Co., Ltd.).

[Graphitization Treatment Step]

Subsequently, the pulverized carbide particles are graphitized to produce graphitized material particles. A graphitization treatment temperature is preferably 2600° C. to 3200° C. If the graphitization treatment temperature is less than 2600° C., crystal development is insufficient, resulting in low capacity, and if the graphitization treatment temperature is more than 3200° C., the graphitization treatment is difficult. The graphitization treatment temperature is more preferably 2850° C. to 3100° C. The atmosphere for the graphitization treatment is preferably an inert atmosphere such as nitrogen or argon.

[Surface Coating Step]

Next, the surface of the graphitized material particles is coated with a carbonaceous precursor in an amount of 0.5% by mass to 10.0% by mass. As described above, the carbonaceous precursor to be coated is preferably an amorphous carbonaceous material such as a coal-based pitch. Specific examples thereof include pitches such as coal-based pitches and petroleum-based pitches, resins such as phenol resins and furan resins, and mixtures of these pitches and resins, but are not particularly limited thereto, and conventionally known ones can be used. From the viewpoint of economy and the like, pitches such as coal-based pitches and petroleum-based pitches are preferable. Specific examples of coal-based pitches include coal tar pitch and coal liquefaction pitch.

[Coating Amount of Carbonaceous Material]

A coating amount of the carbonaceous precursor to be coated on the surface of the graphitized material particles is preferably 0.5% by mass to 10.0% by mass. If the coating amount is less than 0.5% by mass, an edge surface of a graphite layer cannot be sufficiently covered, and improvement of the initial efficiency is insufficient. If the coating amount is more than 10.0% by mass, a thickness of a coating layer is too large, which hinders intercalation/deintercalation of lithium, resulting in deterioration of input-output characteristics. The coating amount is more preferably 1.0% by mass to 7.0% by mass. The coating amount is further preferably 2.0% by mass to 5.0% by mass.

[Coating Method]

A coating method is not particularly limited, and a method of mixing the graphitized material particles with a carbonaceous precursor in powder form or rendered in liquid form by heating and melting by a kneader or the like is preferable. In addition, a method of mixing a solution in which a carbonaceous precursor is dissolved in a solvent with a kneader or the like can be mentioned.

[Firing Step]

The carbonaceous precursor is coated onto the graphitized material particles and then fired to form a carbonaceous fired body film on the surface of the graphitized material particles. The firing temperature at this time is preferably 900° C. to 1200° C. If the firing temperature is less than 900° C., an irreversible capacity of the film increases, which causes a decrease in initial efficiency. If the firing temperature is more than 1200° C., the crystallinity of the film increases too much, and the input-output characteristics deteriorate. The firing temperature is more preferably 950° C. to 1150° C., and further preferably 980° C. to 1120° C.

A firing time is preferably more than 3 hours. This is because the crystallinity does not increase if the firing time is short. The firing time is more preferably 3.5 hours to 8 hours. The firing time is most preferably 3.5 hours to 5 hours. If the firing time is too long, productivity decreases.

The atmosphere at the time of firing is preferably a non-oxidizing atmosphere. This is because in an oxidizing atmosphere, the coated carbonaceous precursor burns and disappears, and even a small amount of oxygen generates a functional group on the surface to promote surface reactivity, so that an atmosphere such as under a nitrogen stream, under an argon stream, under a helium stream, or under a vacuum, or a substantially non-oxidizing atmosphere created by oxidizing coke breeze or the like itself in a surrounding region to make one that suppresses oxidization of a fired body, and thus to reduce an oxygen concentration is preferably selected.

A purpose of forming the carbonaceous fired body film on the surface of the graphitized material particles is to suppress decomposition of the electrolytic solution on a surface of the negative electrode and improve safety of a lithium ion secondary battery. In order to suppress the decomposition of the electrolytic solution on the surface of the negative electrode, it is preferable to use a material having a small specific surface area as the carbon material for a negative electrode. As described above, the surface of the graphitized material particles is coated with the carbonaceous precursor such as pitch and then fired to form the carbonaceous fired body film, whereby the specific surface area of the carbon material can be reduced, and a negative electrode using the carbon material can be used stably.

An amount of the carbonaceous fired body adhered is preferably 0.3% by mass to 8.0% by mass. If the amount is less than 0.3% by mass, the edge surface of the graphite layer cannot be sufficiently covered, and improvement of the initial efficiency is insufficient. If the amount is more than 8.0% by mass, the thickness of the coating layer is too large, which hinders intercalation/deintercalation of lithium, resulting in deterioration of the input-output characteristics. The amount is more preferably 0.5% by mass to 6.0% by mass. The amount is further preferably 1.0% by mass to 5.0% by mass.

[Negative Electrode]

Next, the negative electrode for a lithium ion secondary battery of the present invention uses the above-mentioned carbon material for a negative electrode, and can be obtained by applying a paste-like paint (negative electrode composite), formed by mixing a binder or the like with the carbon material for a negative electrode, to a current collector to become an electrode, and drying the coating and pressing. A coated electrode density of the negative electrode formed by applying the paste-like paint is preferably 1.10 g/cm$^3$ or more.

The coated electrode density (g/cm$^3$) of the negative electrode is an index indicating a coated weight of the negative electrode per specific volume. As a method of obtaining the coated electrode density, after the negative electrode is punched out to a certain area, the weight (using an electronic balance) and thickness (using a micrometer) are measured, and weights of 10 sheets obtained by punching out only a current collector so that the sheets have the same area are measured and averaged to obtain a weight of the current collector. In addition, a thickness of the current collector is obtained from a density of metal of the current collector, and the coated electrode density of the negative electrode can be obtained from the following equation (7).

Coated electrode density of negative electrode=
(weight of negative electrode−weight of current collector)/(thickness of negative electrode−thickness of current collector)×(punched area) (7)

A preferred range of the coated electrode density is 1.10 g/cm$^3$ or more, a more preferred range is 1.10 g/cm$^3$ to 2.00 g/cm$^3$, and a further preferred range is 1.20 g/cm$^3$ to 1.90 g/cm$^3$.

[Method of Producing Negative Electrode]

Although a method of producing the negative electrode of the present invention uses the carbon material for a negative electrode of the present invention, as described above, the production method is characterized in that a paste-like paint (also referred to as a negative electrode composite) is prepared by mixing a binder with the carbon material, applied to a current collector serving as an electrode at a coating weight of 3 mg/cm$^2$ to 15 mg/cm$^2$, dried, and then pressed. The other steps related to the method of producing a negative electrode are not particularly limited, and can be performed according to a normal production method.

When the negative electrode is produced, first, a paint (negative electrode composite) is prepared by adding a binder to the carbon material of the present invention. As the binder, those having chemical stability and electrochemical stability with respect to an electrolyte are preferably used, and examples of the binder include resin polymeric compounds such as carboxymethyl cellulose, metal ion compositions thereof such as sodium, rubber-like polymer compounds such as styrene-butadiene rubber, fluororesin powders such as polytetrafluoroethylene and polyvinylidene fluoride, polyethylene, and polyimide. An amount of the binder added is preferably about 1% by mass to 20% by mass based on a total amount of the paint. The binder is added to the carbon material of the present invention and mixed using a kneader such as a planetary mixer, and, in addition, distilled water is added to adjust a solid content ratio. Then, a pasting medium such as styrene-butadiene rubber emulsion is added to prepare a paste-like paint (negative electrode composite).

Next, this paint is applied to one or both sides of the current collector at a coating weight of 3 mg/cm$^2$ to 15 mg/cm$^2$, a solvent is volatilized with a blower dryer or the like, dried, and pressed to form a paint layer on the current collector. The amount of the paint to be applied (coating weight) is preferably 3 mg/cm$^2$ to 15 mg/cm$^2$, and more preferably 5 mg/cm$^2$ to 15 mg/cm$^2$.

The shape of the current collector is not particularly limited, and examples thereof include foil shapes and net shapes such as meshes and expanded metals. Examples of the material of the current collector include copper, stainless steel, and nickel.

The paste-like paint is dried, then pressed using a pressurizer such as a roller press, and molded to fit to a battery structure to form a negative electrode. Preferred press conditions are appropriately selected depending on the structure and form of the negative electrode, the particle diameter of the carbon material for a negative electrode, the paint (negative electrode composite), or the like, or the other conditions.

[Lithium Ion Secondary Battery]

Next, a lithium ion secondary battery using the negative electrode of the present invention as an electrode will be described.

A lithium ion secondary battery usually includes a negative electrode, a positive electrode, and a nonaqueous electrolytic solution as main battery components, and the positive electrode and the negative electrode are each supplied with lithium ions as a layered compound, a lithium-containing compound, or a substance capable of occluding lithium ions in a cluster form. The intercalation/deintercalation of lithium ions in a charge-discharge process is performed between layers. This is a battery mechanism in which the lithium ions are doped into the negative electrode during charging and dedoped from the negative electrode during discharging.

The lithium ion secondary battery of the present invention is a carbon material for a negative electrode, which has a carbonaceous film on the surface of graphitized material particles of a mesophase microbead. In this lithium ion secondary battery, the 50% by volume particle diameter ($D_{50}$) in the cumulative frequency distribution is 1.0 μm or more and less than 5.0 μm, the specific surface area ($S_{BET}$) by the BET method is 6.5 m$^2$/g or less, the tap density ($D^{TAP}$) is 0.70 g/cm$^3$ or more, and the Raman R value obtained by the Raman spectroscopy is more than 0.100 and less than 0.300. Although the lithium ion secondary battery includes a negative electrode using the carbon material and other battery components (positive electrode, nonaqueous electrolytic solution, etc.), the other battery components are not particularly limited and conform to components of a general lithium ion secondary batteries.

[Positive Electrode]

As a material for the positive electrode (positive electrode active material), it is preferable to select a material capable of doping or dedoping a sufficient amount of lithium ions. Examples of such positive electrode active materials include transition metal oxides, transition metal chalcogenides, vanadium oxides, lithium-containing compounds derived from these compounds, Chevrel-phase compounds represented by general formula $M_XMo_6S_{8-y}$ (in the formula, X is a value in the range of $0 \le X \le 4$, Y is a value in the range of $0 \le Y \le 1$, and M represents a metal such as a transition metal), activated carbons and activated carbon fibers. These materials may be used singly, or two or more may be used in combination. For example, a carbonate salt such as lithium carbonate may be added to the positive electrode active material.

The lithium-containing transition metal oxides are complex oxides of lithium and a transition metal, or may be solid solutions of lithium and two or more transition metals. Specifically, the lithium-containing transition metal oxides are represented by $LiM(1)_{1-p}M(2)_pO_2$ (in the chemical formula, P is a value in the range of $0 \le P \le 1$, and M(1) and M(2) are each at least one transition metal element), or are represented by $LiM(1)_{2-q}M(2)_qO_4$ (in the chemical formula, Q is a value in the range of $0 \le Q \le 1$, and M(1) and M(2) are each at least one transition metal element). Here, examples of the transition metal elements represented by M include Co, Ni, Mn, Cr, Ti, V, Fe, Zn, Al, In and Sn, and Co, Fe, Mn, Ti, Cr, V and Al are particularly preferable.

For example, the lithium-containing transition metal oxide can be obtained by, for example, mixing oxides or salts of Li or a transition metal as starting materials in accordance with the composition and firing the mixture in an oxygen atmosphere at a temperature in the range of 600 to 1000° C. The starting materials are not limited to oxides or salts, and the synthesis is possible from hydroxides and the like.

As a method of forming a positive electrode using such a positive electrode material, for example, a paste-like positive electrode composite paint containing a positive electrode active material, a binder and a conductive agent is applied onto one or both sides of a current collector to form a positive electrode composite layer. The binder may be any of those mentioned as examples with respect to the negative electrodes. Examples of the conductive agents include fine particulate carbon materials, fibrous carbon materials, graphites and carbon blacks. The shapes of the current collectors are not particularly limited and may be similar to the shapes in the negative electrodes. The materials are usually aluminum, nickel, stainless steel, and the like.

In the formation of the negative electrodes and the positive electrodes, various known additives such as conductive agents and binders may be used appropriately.

[Nonaqueous Electrolyte]

As a nonaqueous electrolyte which is one of the components of the lithium ion secondary battery, a usual nonaqueous electrolyte containing a lithium salt such as $LiPF_6$ or $LiBF_4$ as the electrolyte salt is used. The nonaqueous electrolyte may be a liquid nonaqueous electrolytic solution or a polymer electrolyte such as a solid electrolyte or a gel electrolyte.

In the case of the liquid nonaqueous electrolytic solutions, aprotic organic solvents such as ethylene carbonate, propylene carbonate and dimethyl carbonate may be used as the nonaqueous solvents.

In the case of the polymer electrolytes, the polymer electrolytes contain matrix polymers that are gelled with plasticizers (nonaqueous electrolytic solutions). The matrix polymer may be a polymer or a mixture of polymers, for example, ether polymers such as polyethylene oxide and crosslinked products thereof, polymethacrylates, polyacrylates, and fluoropolymers such as polyvinylidene fluoride and vinylidene fluoride-hexafluoropropylene copolymer. In particular, fluoropolymers are preferable from viewpoints such as redox stability.

The electrolyte salts and the nonaqueous solvents that constitute the plasticizers (the nonaqueous electrolytic solutions) used in the polymer electrolytes may be similar to those used in the liquid electrolyte solutions.

[Structure of Lithium Ion Secondary Battery]

The lithium ion secondary batteries of the present invention usually involve separators such as microporous films of polypropylene or polyethylene, stacks of such films, and nonwoven fabrics. The use of gel electrolytes is also possible. In this case, for example, the negative electrode including the negative electrode material of the present invention, the gel electrolyte and the positive electrode are stacked in this order and accommodated inside a battery case. The lithium ion secondary batteries of the present invention may have any structures, and the shapes or the configurations of the structures are not particularly limited and may be freely selected from, for example, cylindrical forms, square forms and coin forms.

EXAMPLES

Hereinafter, the present invention will be specifically described with reference to examples. However, the present invention is not limited thereto.

Example 1

Coal tar was heated at 350° C. for 0.5 hours and then further heated at 450° C. for 0.2 hours to generate mesophase microbeads. Pitch was extracted from the heated coal tar using tar heavy oil (boiling point: 200 to 300° C.), and mesophase microbeads were separated from a pitch matrix by filtration. Small microbeads obtained using a rotary kiln was fired at 500° C. to obtain a carbide of mesocarbon microbeads. The carbide of the mesophase microbeads was pulverized with a jet mill to have a $D_{50}$ particle diameter of 3.3 μm, and then graphitized at 3000° C. Coal-based pitch was mixed (surface coated) with the obtained graphitized material particles, placed in a container with a lid made of graphite, and fired at 1100° C. for 4 hours in an inert atmosphere to obtain a carbon material.

Example 2

The carbide of the mesophase microbeads of Example 1 was pulverized with a jet mill to have a $D_{50}$ particle diameter of 2.2 μm. The other conditions were the same as in Example 1.

Example 3

A carbon material was obtained in the same manner as in Example 1 except for that the carbide of the mesophase microbeads obtained in Example 1 was pulverized with a jet mill to have a $D_{50}$ particle diameter of 3.0 μm and that the amount of coal-based pitch adhered was halved with respect to that in Example 1 and firing was performed.

Comparison Example 1

The carbide of the mesophase microbeads obtained in Example 1 was pulverized with a jet mill to have a $D_{50}$ particle diameter of 15.0 µm, and then graphitized at 3000° C. This graphitized product was pulverized with a jet mill to have a $D_{50}$ particle diameter of 4.1 µm to obtain a carbon material. (No coating treatment was performed.)

Comparative Example 2

The carbide of the mesophase microbeads obtained in Example 1 was pulverized with a jet mill to have a $D_{50}$ particle diameter of 15.0 µm, and then graphitized at 3000° C. This graphitized product was pulverized with a jet mill to have a $D_{50}$ particle diameter of 4.1 µm. Coal-based pitch was mixed (surface coated) with the obtained graphite particles, placed in a container with a lid made of graphite, and fired at 1100° C. for 4 hours in an inert atmosphere to obtain a carbon material.

Comparative Example 3

The carbide of the mesophase microbeads obtained in Example 1 was pulverized with a jet mill to have a $D_{50}$ particle diameter of 3.3 µm, and then graphitized at 3000° C. to obtain a carbon material. (No coating treatment was performed.)

Comparative Example 4

The carbide of the mesophase microbeads obtained in Example 1 was pulverized with a jet mill to have a $D_{50}$ particle diameter of 2.2 µm, and then graphitized at 3000° C. to obtain a carbon material. (No coating treatment was performed.)

Comparative Example 5

The carbide of the mesophase microbeads obtained in Example 1 was pulverized with a jet mill to have a $D_{50}$ particle diameter of 5.5 µm, and then graphitized at 3000° C. to obtain a carbon material. (No coating treatment was performed.)

Comparative Example 6

The carbide of the mesophase microbeads of Example 1 was pulverized with a jet mill to have a $D_{50}$ particle diameter of 5.5 µm. The other conditions were the same as in Example 1.

Comparative Example 7

A carbon material was obtained in the same manner as in Example 1 except for that the carbide of the mesophase microbeads obtained in Example 1 was pulverized with a jet mill to have a $D_{50}$ particle diameter of 9.7 µm and that the amount of coal-based pitch adhered was halved with respect to that in Example 1 and firing was performed.

Comparative Example 8

A carbon material was obtained in the same manner as in Example 1 except for that the carbide of the mesophase microbeads obtained in Example 1 was pulverized with a jet mill to have a $D_{50}$ particle diameter of 15.0 µm and that the amount of coal-based pitch adhered was halved with respect to that in Example 1 and firing was performed.

<Evaluation>
(Evaluation of Carbon Material)

For the carbon materials used in the above Examples and Comparative Examples, the $D_{50}$ particle diameter (unit: µm), the specific surface area by the BET method (unit: m$^2$/g), the tap density ($D_{TAP}$, unit: g/cm$^3$), the true specific gravity ρ (unit: g/cm$^3$), the average interplanar spacing $d_{002}$ value (unit: nm) determined by the X-ray diffraction method, and the Raman R value were measured by the methods described above.

For the amount of carbonaceous film, the carbonaceous precursor (alone) was fired under the same firing conditions as in Examples, and an amount of film was calculated from an amount of carbon remaining.

Next, coin-shaped secondary batteries for evaluation shown in FIG. 1 were fabricated while using the carbon materials obtained in Examples and Comparative Examples as negative electrodes, and various evaluations were performed. The results are illustrated in Table 1.

(Preparation of Paint)

First, a paste-like paint (negative electrode composite) was prepared from the obtained carbon material.

Specifically, using a planetary mixer as a mixer, the carbon material (98 parts by mass) and 50 parts by mass of an aqueous solution of sodium carboxymethyl cellulose (2 parts by mass in terms of solid) were introduced, and stirred at 50 rpm for 30 minutes. In addition, distilled water was added to adjust the solid content to 55%, and stirring was performed for another 15 minutes. Then, styrene-butadiene rubber emulsion (1 part by mass in terms of solid) was added to prepare a paint paste.

(Fabrication of Negative Electrode)

The paint paste prepared was applied onto a copper foil, serving as a current collector, with a uniform thickness. The coated foil was placed in an air blow dryer, and the solvent was evaporated at 100° C., thereby forming a paint layer. Next, the paint layer was pressed with a roller press and was punched into a circular shape with a diameter of 15.5 mm. Thus, a negative electrode (working electrode) was fabricated which had the paint layer closely attached to the copper foil current collector. Before subjected to evaluation, the electrode was dried in vacuum at 100° C. for at least 8 hours.

(Preparation of Electrolytic Solution)

As an electrolytic solution, ethylene carbonate (33% by volume) and methyl ethyl carbonate (67% by volume) were mixed with each other, and LiPF$_6$ was dissolved in the obtained mixed solvent in a concentration of 1 mol/dm$^3$ to prepare a nonaqueous electrolytic solution.

A separator 5 and a working electrode 2 of the coin-shaped secondary battery for evaluation (also simply referred to as "evaluation battery") shown in FIG. 1 were soaked in a nonaqueous electrolytic solution and were impregnated with the solution beforehand.

(Fabrication of Evaluation Battery)

Next, the evaluation battery shown in FIG. 1 was fabricated using the fabricated working electrode (negative electrode).

First, a lithium metal foil was pressed against a nickel net, and these were punched together into a circular shape having a diameter of 15.5 mm. Thus, a disk-shaped counter electrode 4 was fabricated which was composed of a lithium foil closely attached to a nickel net current collector 7a.

Next, the separator 5 was interposed between the working electrode (negative electrode) 2 closely attached to a current collector 7b and the counter electrode (positive electrode) 4 closely attached to the current collector 7a and stacked.

Thereafter, the working electrode 2 was accommodated in an exterior cup 1, and the counter electrode 4 was accommodated in an exterior can 3. The exterior cup 1 and the exterior can 3 were coupled together, and peripheral edge portions of the exterior cup 1 and the exterior can 3 were engaged with each other through an insulating gasket 6, thereby tightly closing the structure. The evaluation battery was thus fabricated.

In the evaluation battery fabricated, the peripheral edge portions of the exterior cup 1 and the exterior can 3 were engaged with each other through the insulating gasket 6, and a tightly closed structure was formed. Inside the tightly closed structure, as shown in FIG. 1, the current collector 7a, the counter electrode (positive electrode) 4, the separator 5, the working electrode (negative electrode) 2, and the current collector 7b were stacked sequentially from an inner surface of the exterior can 3 toward an inner surface of the exterior cup 1.

(Charge-Discharge Test)

The evaluation battery fabricated was subjected to the following charge-discharge test at 25° C. In the charge-discharge test using lithium as the counter electrode, "charging" was the process in which lithium ions were doped into the graphite particles, and "discharging" was the process in which the lithium ions were dedoped from the graphite particles.

First, the battery was charged at a constant current of 0.9 mA until the circuit voltage reached 0 mV. When the circuit voltage reached 0 mV, the charging was switched to constant-voltage charging, and the battery was continuously charged until the current value became 20 μA. The charging capacity (also referred to as the "initial charge capacity") (unit: mAh/g) was determined from the amount of current that had been passed during this process. Thereafter, the battery was allowed to stand for 120 minutes. Next, the battery was discharged at a constant current of 0.9 mA until the circuit voltage reached 1.5 V. The discharging capacity (also referred to as the "initial discharging capacity") (unit: mAh/g) was determined from the amount of current that had been passed during this process. This was the first cycle.

Based on the results of the charge-discharge test, initial charge-discharge loss (unit: mAh/g) was obtained from the following equation (8).

Initial charge-discharge loss=Initial charge capacity− Initial discharge capacity  (8)

(Initial Charge-Discharge Efficiency)

Similarly, initial charge-discharge efficiency (unit: %) was obtained from the following equation (9).

Initial charge-discharge efficiency=(initial discharge capacity/initial charge capacity)×100  (9)

Next, charging and discharging were performed in the same manner as described above such that a charge current was 0.5 C and a discharge current was 2 C, and the discharge capacity (discharge capacity at 2 C current value) was determined. Then, a 2 C discharge rate (unit: %) was calculated from the following equation (10). 1 C is a current value when an amount of electricity of a target negative electrode in a fully charged state is released in 1 hour, 0.5 C is a current value when the amount of electricity is released in 2 hours, and 2 C is a current value when the amount of electricity is released in 30 minutes.

2 C discharge rate=discharge capacity at 2 C current value/discharge capacity of first cycle×100  (10)

TABLE 1

| | Production condition | | | | Characteristics of carbon material | | | | |
|---|---|---|---|---|---|---|---|---|---|
| | $D_{50}$ particle diameter during graphitization (μm) | Carbonaceous material for coating | Coating amount (mass %) | Production process* | $D_{50}$ particle diameter after coating (μm) | True specific gravity ρ (g/cm³) | Specific surface area $S_{CALC}$ (m²/g) | Specific surface area $S_{BET}$ (m²/g) | Specific surface area ratio ($S_{BET}/S_{CAL}$) |
| Example 1 | 3.3 | Coal-based pitch | 4.0 | A | 3.5 | 2.24 | 0.77 | 3.1 | 4.1 |
| Example 2 | 2.2 | Coal-based pitch | 4.0 | A | 2.5 | 2.24 | 1.07 | 3.7 | 3.5 |
| Example 3 | 3.0 | Coal-based pitch | 2.0 | A | 3.1 | 2.24 | 0.86 | 3.3 | 3.8 |
| Comparative Example 1 | 15.0 | None | None | B | 4.1 | 2.21 | 0.66 | 15.0 | 22.7 |
| Comparative Example 2 | 15.0 | Coal-based pitch | 4.0 | C | 4.1 | 2.24 | 0.65 | 10.9 | 16.7 |
| Comparative Example 3 | 3.3 | None | None | D | 3.3 | 2.23 | 0.82 | 3.6 | 4.4 |
| Comparative Example 4 | 2.2 | None | None | D | 2.5 | 2.24 | 1.07 | 4.3 | 4.0 |
| Comparative Example 5 | 5.5 | None | None | D | 5.4 | 2.24 | 0.50 | 1.5 | 3.0 |
| Comparative Example 6 | 5.5 | Coal-based pitch | 4.0 | A | 6.0 | 2.20 | 0.45 | 1.2 | 2.6 |
| Comparative Example 7 | 9.7 | Coal-based pitch | 2.0 | A | 9.3 | 2.23 | 0.29 | 1.4 | 4.8 |
| Comparative Example 8 | 15.0 | Coal-based pitch | 2.0 | A | 15.0 | 2.20 | 0.18 | 1.3 | 7.2 |

TABLE 1-continued

| | Production condition | | | | Characteristics of carbon material | | | | |
|---|---|---|---|---|---|---|---|---|---|
| | $D_{50}$ particle diameter during graphitization (μm) | Carbonaceous material for coating | Coating amount (mass %) | Production process* | $D_{50}$ particle diameter after coating (μm) | True specific gravity ρ (g/cm³) | Specific surface area $S_{CALC}$ (m²/g) | Specific surface area $S_{BET}$ (m²/g) | Specific surface area ratio ($S_{BET}/S_{CAL}$) |

| | Characteristics of carbon material | | | Battery characteristics | | | | |
|---|---|---|---|---|---|---|---|---|
| | Tap density $D_{TAP}$ (g/cm³) | X-ray diffraction $D_{002}$ value (nm) | Raman R value | Coated electrode density (g/cm³) | Initial discharge capacity (mAh/g) | Initial charge-discharge loss (mAh/g) | Initial charge-discharge efficiency (%) | 2C discharge rate (%) |
| Example 1 | 0.75 | 0.3361 | 0.169 | 1.35 | 332 | 29 | 92.0 | 99.0 |
| Example 2 | 0.70 | 0.3360 | 0.160 | 1.32 | 325 | 28 | 92.0 | 99.3 |
| Example 3 | 0.91 | 0.3361 | 0.160 | 1.37 | 324 | 24 | 93.0 | 98.9 |
| Comparative Example 1 | 0.30 | 0.3361 | 0.191 | 1.03 | 342 | 71 | 82.9 | 88.0 |
| Comparative Example 2 | 0.28 | 0.3361 | 0.201 | 0.88 | 348 | 62 | 84.9 | 90.0 |
| Comparative Example 3 | 0.80 | 0.3360 | 0.105 | 1.43 | 331 | 142 | 70.0 | 93.0 |
| Comparative Example 4 | 0.72 | 0.3361 | 0.110 | 1.37 | 321 | 107 | 75.0 | 94.0 |
| Comparative Example 5 | 0.80 | 0.3360 | 0.098 | 1.40 | 324 | 139 | 70.0 | 91.0 |
| Comparative Example 6 | 0.82 | 0.3361 | 0.161 | 1.40 | 325 | 36 | 90.0 | 98.0 |
| Comparative Example 7 | 0.94 | 0.3360 | 0.180 | 1.43 | 337 | 37 | 90.0 | 97.0 |
| Comparative Example 8 | 1.03 | 0.3359 | 0.170 | 1.44 | 345 | 56 | 86.0 | 96.0 |

*Production process
A: Mesophase microbead carbide → pulverization → graphitization → coating → firing
B: Mesophase microbead carbide → pulverization → graphitization → pulverization
C: Mesophase microbead carbide → pulverization → graphitization → pulverization → coating → firing
D: Mesophase microbead carbide → pulverization → graphitization Thus, from the comparison between Examples and Comparative Examples, Examples demonstrate the small initial loss, the high initial efficiency (initial charge-discharge efficiency), and the high 2 C discharge rate. On the other hand, Comparative Examples demonstrate the large initial loss, the low initial efficiency (initial charge-discharge efficiency), and the low 2 C discharge rate. When pulverization was performed after graphitization as in Comparative Example 2, the specific surface area ratio ($S_{BET}/S_{CALC}$) increased, and the initial charge-discharge loss increased (initial charge-discharge efficiency decreased). In Comparative Examples 6, 7 and 8, it can be seen that the $D_{50}$ particle diameter after pulverization is as large as 5.0 μm or more, and the initial efficiency (initial charge-discharge efficiency) and the 2 C discharge rate are low.

The carbon material for a negative electrode of the present invention has a small specific surface area, the initial charge-discharge efficiency and the 2 C discharge rate are high due to carbonaceous fired body coating, battery characteristics are improved, and use for a long period of time can be achieved.

REFERENCE SIGNS LIST

1 Exterior cup
2 Working electrode (negative electrode)
3 Exterior can
4 Counter electrode (positive electrode)
5 Separator
6 Insulating gasket
7a, 7b Current collector

The invention claimed is:

1. A carbon material for a negative electrode of a lithium ion secondary battery, said carbon material comprising a carbonaceous film on a surface of graphitized material particles of a mesophase microbead, a 50% by volume particle diameter ($D_{50}$) in a cumulative frequency distribution being 1.0 μm or more and less than 5.0 μm, a specific surface area ($S_{BET}$) by a BET method being 6.5 m²/g or less, a tap density ($D_{TAP}$) being 0.70 g/cm³ or more, and a Raman R value obtained by Raman spectroscopy being more than 0.100 and less than 0.300, wherein a specific surface area ratio ($S_{BET}/S_{CALC}$) between the specific surface area ($S_{BET}$: m²/g) obtained by the BET method and the specific surface area ($S_{CALC}$: m²/g) calculated from the following equation (1) is 4.1 or less, $$S_{CALC} = 6/(D_{50} \times \rho) \qquad (1)$$

wherein $D_{50}$ is the 50% by volume particle diameter (μm) in the cumulative frequency distribution, and ρ is a true specific gravity (g/cm³).

2. The carbon material for a negative electrode according to claim 1, wherein a value of an average interplanar spacing $d_{002}$ of (002) plane as lattice plane determined by an X-ray diffraction method is 0.3400 nm or less.

3. A negative electrode for a lithium ion secondary battery using the carbon material for a negative electrode according to claim 1.

4. A lithium ion secondary battery using the negative electrode for a lithium ion secondary battery according to claim 3 as an electrode.

5. A negative electrode for a lithium ion secondary battery using the carbon material for a negative electrode according to claim 2.

6. The carbon material for a negative electrode according to claim 1, wherein said 50% by volume particle diameter ($D_{50}$) in a cumulative frequency distribution is 1.0 μm or more and less than 4.5 μm.

7. The carbon material for a negative electrode according to claim 1, wherein said 50% by volume particle diameter ($D_{50}$) in a cumulative frequency distribution is 1.0 μm or more and less than 4.0 μm.

8. The carbon material for a negative electrode according to claim 1, wherein said 50% by volume particle diameter ($D_{50}$) in a cumulative frequency distribution is 1.0 μm or more and less than 3.5 μm.

9. The carbon material for a negative electrode according to claim 1, wherein said Raman R value obtained by Raman spectroscopy is more than 0.100 to 0.250.

10. The carbon material for a negative electrode according to claim 1, wherein said Raman R value obtained by Raman spectroscopy is more than 0.100 and less than 0.200.

11. The carbon material for a negative electrode according to claim 1, wherein said Raman R value obtained by Raman spectroscopy is more than 0.100 to 0.190.

12. The carbon material for a negative electrode according to claim 1, wherein said Raman R value obtained by Raman spectroscopy is more than 0.100 to 0.170.

13. A method of producing the carbon material for a negative electrode according to claim 1, comprising: a step of pulverizing a carbide of a mesophase microbead so that a 50% by volume particle diameter ($D_{50}$) in a cumulative frequency distribution of particles of the carbide is 1.0 μm or more and less than 5.0 μm (pulverizing treatment step); a step of graphitizing the particles of the carbide at 2600° C. to 3200° C. to form graphitized material particles (graphitization treatment step); a step of coating a surface of the graphitized material particles with a carbonaceous precursor in an amount of 0.5% by mass to 10.0% by mass (surface coating step); and a step of firing the graphitized material particles coated with the carbonaceous precursor at 900° C. to 1200° C. to form the carbonaceous precursor into a carbonaceous film (firing step).

14. The method of producing a carbon material for a negative electrode according to claim 13, wherein the firing step is performed at 900° C. to 1200° C. for more than 3 hours.

* * * * *